United States Patent
Lee et al.

(10) Patent No.: US 11,022,076 B2
(45) Date of Patent: Jun. 1, 2021

(54) PURGE SYSTEM FOR FUEL EVAPORATION GAS OF VEHICLE

(71) Applicants: Hyundai Motor Company, Seoul (KR); Kia Motors Corporation, Seoul (KR)

(72) Inventors: Jong Hwan Lee, Seoul (KR); Ju Tae Song, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/563,482

(22) Filed: Sep. 6, 2019

(65) Prior Publication Data

US 2020/0291902 A1    Sep. 17, 2020

(30) Foreign Application Priority Data

Mar. 11, 2019 (KR) .......................... 10-2019-0027467

(51) Int. Cl.
*F02M 25/08* (2006.01)
*B60K 15/03* (2006.01)

(52) U.S. Cl.
CPC ........ *F02M 25/0836* (2013.01); *F02M 25/08* (2013.01); *B60K 2015/03072* (2013.01)

(58) Field of Classification Search
CPC ............... F02M 25/0836; F02M 25/08; B60K 2015/03072
See application file for complete search history.

(56) References Cited

U.S. PATENT DOCUMENTS

| 2015/0354600 | A1  | 12/2015 | Fletcher et al. |
| 2016/0108864 | A1* | 4/2016  | Tochihara ........ F02M 25/0836 123/520 |
| 2017/0009679 | A1* | 1/2017  | Pursifull ............. F01M 13/023 |
| 2019/0368431 | A1* | 12/2019 | Dudar ................. F02D 41/003 |

FOREIGN PATENT DOCUMENTS

| DE | 10 2016 210 570 A1 | 12/2017 |
| EP | 3 339 621 A1 | 6/2018 |
| JP | 2007-303346 A | 11/2007 |
| JP | 2018-178816 A | 11/2018 |
| KR | 10-1361357 B1 | 2/2014 |
| KR | 10-1886091 B1 | 9/2018 |
| KR | 10-1902542 B1 | 9/2018 |

* cited by examiner

*Primary Examiner* — Kevin A Lathers
(74) *Attorney, Agent, or Firm* — Morgan, Lewis & Bockius LLP

(57) ABSTRACT

A purge system for fuel evaporation gas may include an ejector, having a nozzle configured to allow driving fluid to pass therethrough, a driving inlet through which the driving fluid is supplied into the ejector, a suction inlet through which purge gas including a fuel component is drawn as suction fluid from a canister into the ejector, a diffuser outlet through which a mixture of the driving fluid that has passed through the nozzle and the drawn purge gas is discharged out of the ejector, and a suction passage extending from the suction inlet toward a downstream side of the nozzle based on a flow direction of the driving fluid, and a bypass passage coupled from the suction inlet to the driving inlet.

13 Claims, 5 Drawing Sheets

PURGE SYSTEM FOR FUEL EVAPORATION GAS OF VEHICLE

CROSS-REFERENCE TO RELATED APPLICATION

The present application claims priority to Korean Patent Application No. 10-2019-0027467, filed on Mar. 11, 2019, the entire contents of which is incorporated herein for all purposes by this reference.

BACKGROUND OF THE INVENTION

Field of the Invention

The present invention relates to a purge system for fuel evaporation gas of a vehicle. More particularly, it relates to a dual purge type system for purging fuel evaporation gas which is capable of reducing the number of parts and the production cost.

Description of Related Art

As is well known, in a fuel tank of a vehicle, gas formed by evaporation of fuel, i.e., fuel evaporation gas including a fuel component such as hydrocarbon (HC), is generated.

Therefore, to prevent air pollution resulting from fuel evaporation gas generated in the fuel tank, typical vehicles are provided with a canister configured to collect and store fuel evaporation gas generated from the fuel tank.

The canister may include a casing filled with adsorbent material configured for adsorbing fuel evaporation gas transferred from the fuel tank. Activated carbon is widely used as the adsorbent material.

The activated carbon functions to adsorb hydrocarbon (HC) which is a fuel component of fuel evaporation gas drawn into the casing of the canister.

The canister having the above-mentioned configuration adsorbs fuel evaporation gas using the adsorbent material when an engine is in a stopped state. When the engine runs, the fuel evaporation gas that has been adsorbed onto the adsorbent material is removed therefrom by the pressure of air drawn from the outside thereof (the atmosphere), and the removed gas, along with air, is supplied into an engine intake system.

An operation of drawing fuel evaporation gas from the canister into the engine is referred to as a purge operation. Gas drawn from the canister into the engine is referred to as purge gas. The purge gas may be a mixture gas of air and a fuel component such as hydrocarbon removed from the adsorbent material of the canister.

Furthermore, a purge control solenoid valve (hereinafter, referred to as 'PCSV') for controlling the purge operation is disposed on a purge line which couples a purge port of the canister and the engine intake system.

The PCSV is a valve which opens during a purge operation when the engine runs, and is configured to collect fuel evaporation gas generated from the fuel tank in the canister and purge the collected fuel evaporation gas to the engine intake system through the PCSV which is in the open state so that the fuel evaporation gas may be combusted in the engine.

The PCSV is an electronic valve which is controlled by a control unit, e.g., an engine control unit (ECU). To control fuel evaporation gas, depending on a driving state of the vehicle, a control operation of opening or closing the PCSV (to turn on/off the purge operation) or adjusting the degree of opening of the PCSV is performed.

The configuration of a typical canister will be described in more detail. The canister may include a casing filled with adsorbent material (e.g., activated carbon). The casing is provided with a purge port which is coupled to the engine intake system to transfer fuel evaporation gas to the engine side, a loading port which is coupled to a fuel tank so that fuel evaporation gas is drawn into the casing through the loading port, and an atmospheric port which is coupled to an air filter (i.e., a canister filter) so that atmospheric air is drawn into the casing through the atmospheric port.

Furthermore, a partition is provided in an internal space of the casing so that the internal space of the casing is partitioned by the partition into space in which the atmospheric port is disposed and space in which the purge port and the loading port are disposed. While fuel evaporation gas drawn from the fuel tank through the loading port passes through the internal space partitioned by the partition, hydrocarbon which is a fuel component is adsorbed onto the adsorbent material.

Furthermore, if, while the engine runs, the PCSV opens by the control unit and a suction pressure, i.e., an engine negative pressure, is applied from the engine intake system to the internal space of the canister through the purge port, air is drawn through the air filter and the atmospheric port, and gas removed from the adsorbent material by the air is discharged through the purge port and drawn into the engine.

Accordingly, to perform the purge operation of drawing atmospheric air into the canister and removing the fuel component such as hydrocarbon from the adsorbent material in the canister by the drawn air and then drawing the fuel component into the engine, the engine negative pressure is required to be applied to the canister through the purge line and the purge port.

However, in vehicles provided with a turbocharger engine, a negative pressure of the engine intake system including an intake manifold is relatively low, or, when a turbocharger is operated, a positive pressure rather than a negative pressure may be formed in the engine intake system. Hence, it is difficult to perform the purge operation of the canister.

Recently, to meet the trend of downsized engines, use of a gasoline engine, e.g., a turbo gasoline direct injection (GDI) engine, provided with a turbocharger for improving the fuel efficiency and enhancing the output has increased.

In the case of a turbo gasoline engine, when a turbocharger is operated (i.e., the engine is supercharged), a positive pressure is formed in an intake manifold, so that an operation of drawing purge gas using a negative pressure is not performed, whereby purge of fuel evaporation gas from the canister is impossible.

Therefore, in the turbo gasoline engine, use of a typical single purge system is impossible. When purge is impossible, strong fuel smell may occur in the hot season, and it makes it difficult for the engine to comply with the regulations related to exhaust gas due to deterioration of the canister.

The performance of the purge operation varies depending on driving conditions of the engine (for example, when the engine is idle, the purge operation is not performed due to combustion stability, if possible). Furthermore, since the purge operation is mainly performed using an intake side negative pressure, the possibility of the purge operation is determined whether a sufficient negative pressure has been formed.

If a sufficient negative pressure has been formed at the intake side, the purge operation is required to be performed as often as possible so that the fuel component may be removed from the canister.

However, in the case of a turbocharger engine (i.e., a supercharger engine) such as a turbo (T)-GDI engine, an operating area in which a purge function is performed is limited because of the operation (supercharging operation) of a turbocharger. In a downsized engine, since the frequency of the supercharging operation is further increased, a point in time and period of purging the fuel component collected in the canister are further limited.

For example, when a gasoline turbo vehicle travels on an uphill road under high-temperature conditions in the hot season, the amount of evaporation of fuel increases due to an increase in temperature of the fuel. When the turbocharger is operated, if the operation of purging fuel evaporation gas is impossible due to generation of a positive pressure in the intake manifold, the fuel evaporation gas in the canister enters a supersaturated state.

Consequently, discharge of fuel evaporation gas from the canister to the outside is caused, whereby a problem of occurrence of fuel smell may arise.

Furthermore, as condensation of liquefied fuel is repeated in the canister, the performance of the canister may deteriorate, and there is a problem of failure to comply with the regulated regulations.

The above-mentioned problems also similarly occur in hybrid vehicles (HEV, PHEV) in which the number of times purge operations are performed reduces due to a reduction of an engine negative pressure area.

Hence, to overcome the above problems, a dual purge system configured for purging fuel evaporation gas even when the turbocharger is operated has been widely used in turbocharger engines.

In the dual purge system, when the turbocharger is operated, a negative pressure is forcibly formed by an ejector, so that purge gas is drawn to a position previous to a position where a supercharging operation is performed, i.e., a front end portion of a compressor of the turbocharger which is a position previous to a position where a compressing operation is performed.

However, the conventional dual purge system is problematic in that the installation cost and the production costs of parts are excessively increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a dual purge type system of purging fuel evaporation gas which is configured for reducing the number of parts and the production cost.

Various aspects of the present invention provide a purge system for fuel evaporation gas of a vehicle, including an ejector including a nozzle configured to allow driving fluid to pass therethrough, a driving inlet through which the driving fluid is supplied into the ejector, a suction inlet through which purge gas including a fuel component is drawn as suction fluid from a canister into the ejector, a diffuser outlet through which a mixture of the driving fluid that has passed through the nozzle and the drawn purge gas is discharged out of the ejector, and a suction passage extending from the suction inlet toward a downstream side position of the nozzle based on a flow direction of the driving fluid, and a bypass passage coupled from the suction inlet to the driving inlet, wherein a recirculation fluid line is coupled to the driving inlet of the ejector from an engine intake system at a rear end portion of a compressor of a turbocharger, and wherein air compressed by the compressor of the turbocharger is supplied as the driving fluid from the engine intake system to the driving inlet of the ejector, or purge gas which is the suction fluid is drawn from the driving inlet into the engine intake system.

In an exemplary embodiment of the present invention, a purge line may be coupled to the suction inlet of the ejector so that the purge gas is drawn from the canister into the ejector, and the diffuser outlet of the ejector may be coupled to an intake pipe at a front end portion of the compressor of the turbocharger.

In another exemplary embodiment of the present invention, the ejector may further include a first check valve disposed on the suction passage and configured to allow the suction fluid to flow from the suction inlet to the downstream side position of the nozzle and block a reverse flow of the suction fluid.

In yet another exemplary embodiment of the present invention, the ejector may further include a second check valve disposed on the bypass passage and configured to allow the suction fluid to flow from the suction inlet to the driving inlet and block a reverse flow of the suction fluid.

In yet another exemplary embodiment of the present invention, the diffuser outlet of the ejector may be directly coupled to an intake pipe at a front end portion of the compressor of the turbocharger.

In still yet another exemplary embodiment of the present invention, the recirculation fluid line may be coupled from an intake pipe at a rear end portion of a throttle valve to the driving inlet of the ejector.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the present invention are discussed infra.

Figure 1:
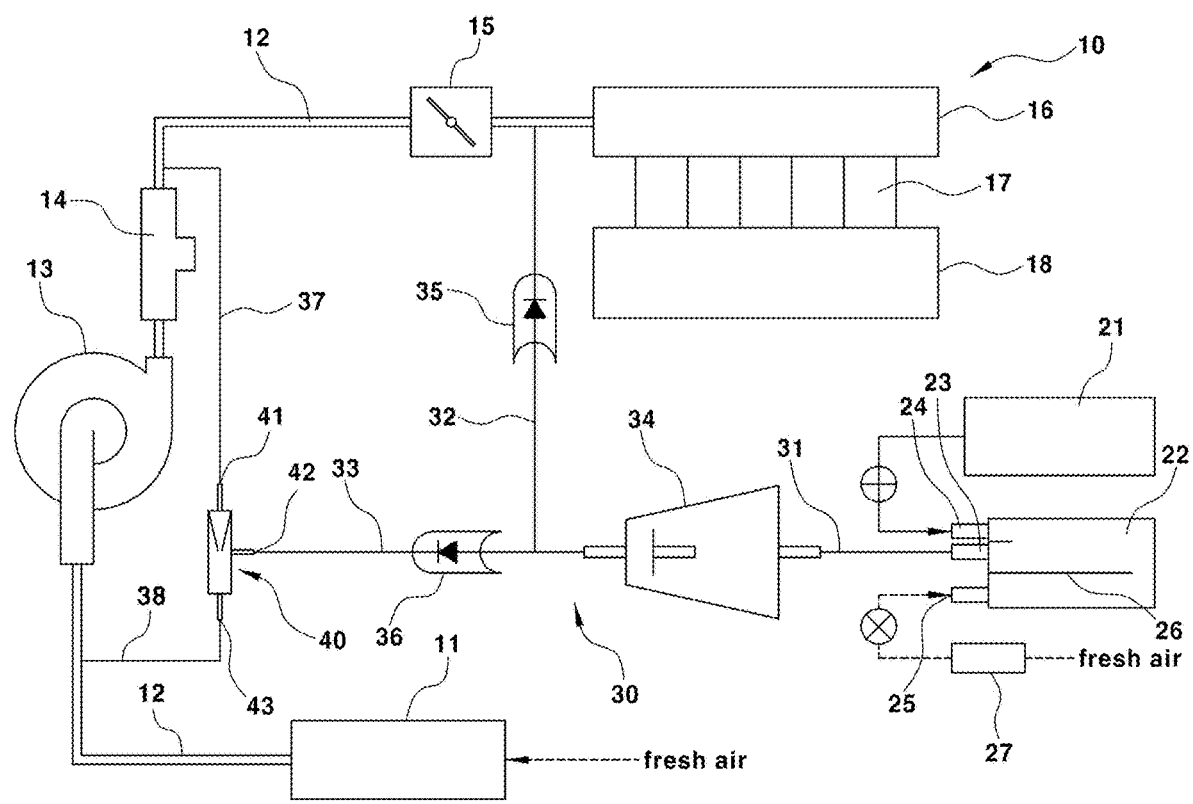
FIG. 1 is a diagram illustrating the configuration of a conventional dual purge system.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the appended drawings so that those skilled in the art can easily implement the present invention. However, the present invention is not limited to the following embodiments but embodied in other types.

In the specification, when an element is referred to as "comprising" or "including" a component, it does not preclude another component but may further include other components unless the context clearly indicates otherwise.

The present invention is related to a purge system for purging fuel evaporation gas from a vehicle.

Typically, fuel evaporation gas generated from a fuel tank is collected in a canister and then purged by a purge system. The purge system draws the fuel evaporation gas from the canister by use of a negative pressure and then supplies the drawn fuel evaporation gas to an engine intake system to allow the fuel evaporation gas to be combusted in the engine.

For the sake of understanding the present invention, a conventional dual purge system which is used in a vehicle provided with a turbocharger engine will be simply described with reference to FIG. 1.

The dual purge system has two purge paths, and any one of the purge paths is selected depending on whether the turbocharger is operated and based on the pressure state of the engine intake system.

Referring to FIG. 1, the air cleaner 11 and the intake pipe 12 are illustrated. Furthermore, FIG. 1 illustrates a compressor 13 of the turbocharger configured to draw air thereinto and compress the air to supply high-pressure air, and an intercooler 14 configured to cool air compressed by the compressor 13.

Furthermore, there is illustrated an engine 10 including a throttle valve 15, a surge tank 16, an intake manifold 17, a cylinder head and block 18, etc.

Air drawn through the air cleaner 11 flows along the intake pipe 12 and is supplied into a combustion chamber in the cylinder head and block 18 via the compressor 13 of the turbocharger, the intercooler 14, the throttle valve 15, the surge tank 16, and the intake manifold 17.

Furthermore, there are illustrated a fuel tank 21 configured to store fuel, a canister 22 configured to collect fuel evaporation gas generated from the fuel tank 21, and a dual purge system 30 configured to supply a fuel component of the fuel evaporation gas collected in the canister 22 to the engine to combust the fuel component.

Here, the canister 22 is provided with a purge port 23, a loading port 24, and an atmospheric port 25. A partition 26 is provided in the canister 22.

In FIG. 1, reference numeral 27 denotes an air filter.

The dual purge system 30 may include a main purge line 31 coupled to the purge port 23 of the canister 22, a first purge line 32 diverging from the main purge line 31 and coupled to the engine intake system, a second purge line 33 diverging from the main purge line 31 and coupled to an ejector 40, a purge control solenoid valve (PCSV) 34 disposed on the main purge line 31 to control a purge operation, check valves 35 and 36 respectively disposed on the first purge line 32 and the second purge line 33, the ejector 40 coupled through a separate pipeline 38 to an intake pipe 12 at a front end portion of the compressor 13, and a recirculation fluid line 37 coupled between the ejector 40 and the intake pipe 12 at a front end portion of the throttle valve 15.

Here, the main purge line 31, the first purge line 32, the second purge line 33, and the pipeline 38 form a purge line through which purge gas flows to the intake pipe 12. The first purge line 32 may diverge from the main purge line 31 and be coupled to the intake pipe 12 at a rear end portion of the throttle valve 15 of the engine intake system.

In the illustrated dual purge system, depending on the pressure state of the surge tank 16, mixture gas of the fuel component drawn from the canister 22 and air (drawn through the atmospheric port) may pass through the PCSV 34 which is in an open state, and then be drawn into the engine intake system through the first purge line 32, or may be drawn into the surge tank 16 through the throttle valve 15 after passing through the second purge line 33, the ejector 40, the pipeline 38, the intake pipe 12 provided at the front end portion of the compressor 13, the compressor 13, the intake pipe 12 provided at the rear end portion of the compressor 13, and the intercooler 14.

Hereinafter, drawn from the canister 22 by the purge system through the main purge line 31, the mixture gas of the fuel component and air will be referred to as 'purge gas'.

The ejector 40 is a device configured to forcibly form a negative pressure when the turbocharger is operated. The recirculation fluid line 37 is coupled to a driving inlet 41 of the ejector 40 through which driving fluid is drawn, and the second purge line 33 is coupled to a suction inlet 42 of the ejector 40 through which suction fluid (purge gas) is drawn.

Furthermore, a diffuser outlet 43 through which a mixture of the driving fluid and the suction fluid is discharged is coupled, through the pipeline 38, to the intake pipe 12 at the front end portion of the compressor 13.

The recirculation fluid line 37 is a pipeline that couples the intake pipe 12 provided at the front end portion of the throttle valve 15 and the driving inlet 41 of the ejector 40. When air drawn through the air cleaner 11 is compressed and supplied by a rotation of the compressor 13 during the operation (supercharging operation) of the turbocharger, air (driving fluid) is drawn from the intake pipe 12 provided at the rear end portion of the compressor 13 to the ejector 40 through the recirculation fluid line 37. While the drawn air passes through the ejector 40, a negative pressure is generated.

In other words, while high-pressure compressed air which is supplied through the recirculation fluid line 37 and the driving inlet 41 of the ejector 40 after having been compressed by the compressor 13 of the turbocharger passes through a nozzle in the ejector 40, a negative pressure is generated and amplified.

Here, if the negative pressure is applied to the canister 22 through the second purge line 33, the main purge line 31, and the open PCSV 34, purge gas (suction fluid) in which air and a fuel component are mixed is drawn from the canister 22 into the ejector 40 through the suction inlet 42.

Consequently, in the ejector 40, the purge gas is mixed with air (driving fluid) supplied through the driving inlet 41, and then the mixture is drawn into the intake pipe 12 provided at the front end portion of the compressor 13 through the diffuser outlet 43 of the ejector 40 and the pipeline 38. Subsequently, the mixture is supplied into the combustion chamber of the engine along the intake pipe 12 via a path including the compressor 13, the intercooler 14, the throttle valve 15, the surge tank 16, and the intake manifold 17.

A single purge system is a system which does not have the second purge line 33 and the ejector 40, so that while the PCSV 34 is in an open state, purge gas is drawn from the canister 22 through the purge lines 31 and 32 only by a negative pressure of the engine (a negative pressure of the surge tank) and then combusted in the combustion chamber of the engine.

On the one hand, the dual purge system 30 is a system in which purge is possible even when a positive pressure is formed in the surge tank 16, the intake manifold 17, etc. By inflow of compressed air during the operation of the turbocharger. In the dual purge system 30, since the turbocharger is disposed, the second purge line 33 and the ejector 40 are additionally disposed.

In the dual purge system 30, when a negative pressure is generated in the surge tank 16, etc. of the engine, purge gas is drawn from the canister 22 through the main purge line 31 and the first purge line 32 and then supplied into the engine. However, when a positive pressure is formed in the engine intake system by the operation of the turbocharger, purge gas is drawn into the ejector 40 through the main purge line 31 and the second purge line 33, and then supplied into the combustion chamber of the engine along the intake pipe 12.

However, in the dual purge system 30 in which any one of the two purge paths is selected depending on whether the turbocharger is operated, complex pipelines are connected and configured among the ejector 40, the canister 22, and the engine intake system to perform a dual purge function.

In other words, a plurality of gas lines such as the main purge line 31, the first purge line 32, the second purge line 33, the recirculation fluid line 37, the pipeline 38, etc. Are required. Such gas lines are complexly connected between components, thus leading to an increase in expenses and production cost.

Therefore, a dual purge system configured for reducing expenses and production cost by reducing the number of gas lines and simplifying the configuration of the gas lines compared to those of the conventional dual purge system is required.

Hereinafter, a purge system for fuel evaporation gas in accordance with various exemplary embodiments of the present invention will be described in detail with reference to the accompanying drawings.

Figure 2:
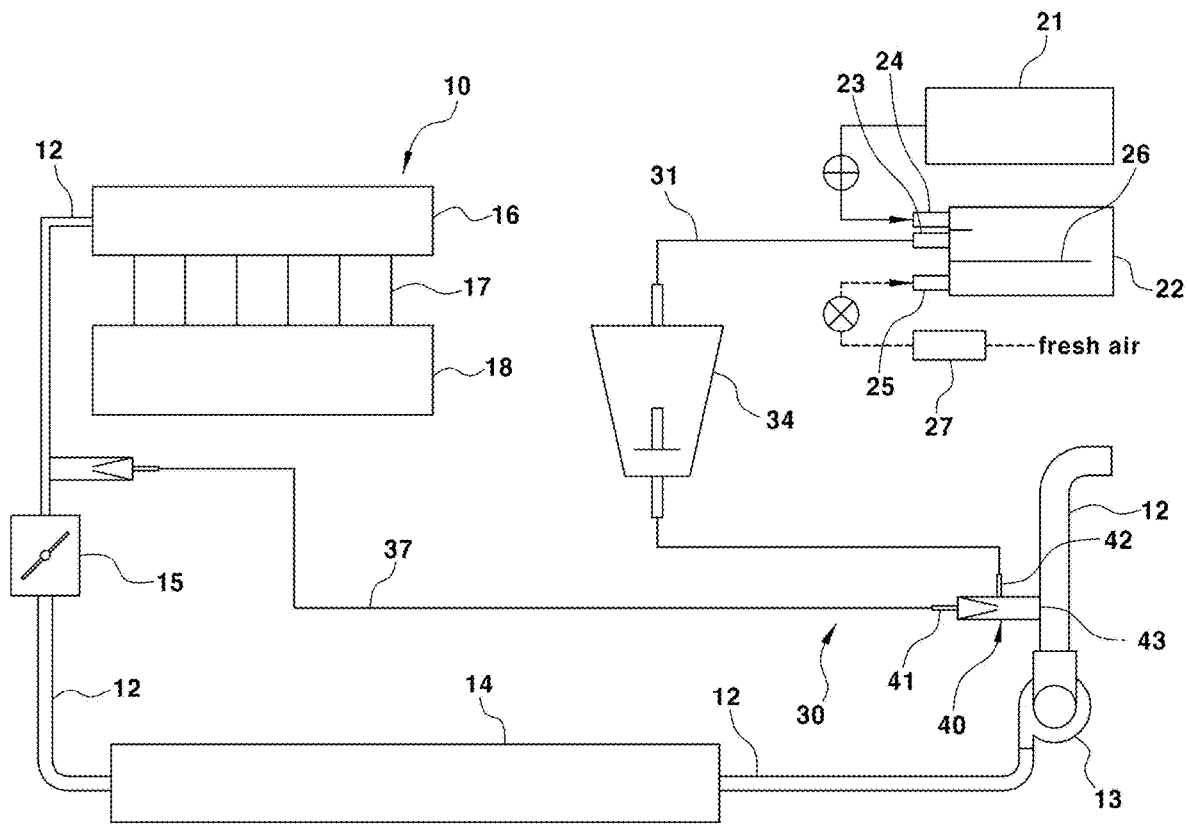
FIG. 2 is a diagram illustrating the configuration of a purge system in accordance with various exemplary embodiments of the present invention.

FIG. 2 is a diagram illustrating the configuration of the purge system in accordance with various exemplary embodiments of the present invention. Reference numeral 13 denotes a compressor of a turbocharger.

Figure 3:
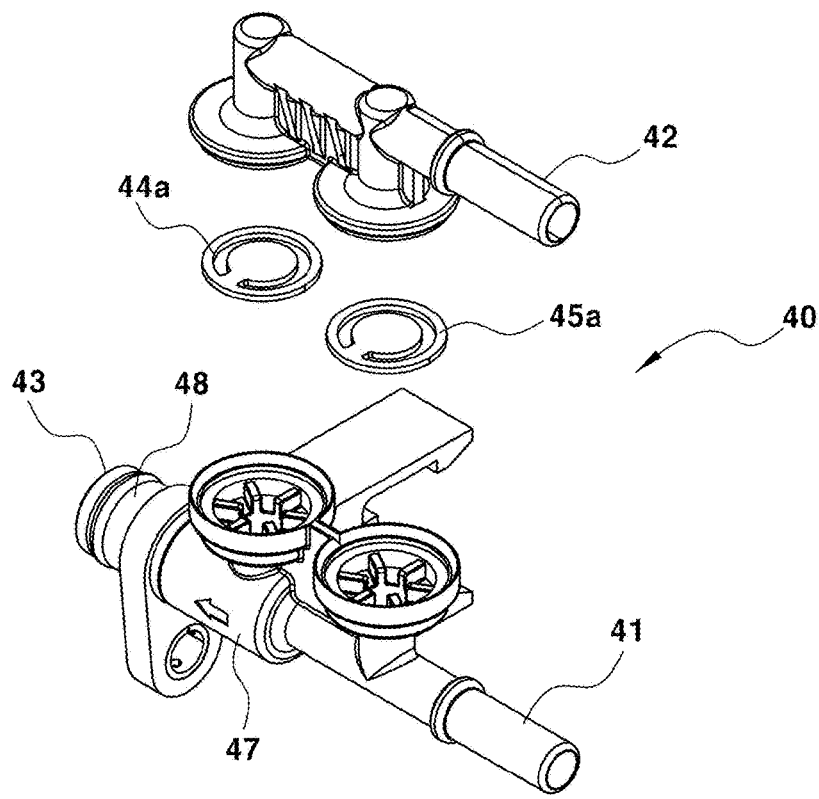
FIG. 3 is an exploded perspective view exemplarily illustrating a main configuration of a dual-pass ejector in the purge system in accordance with various exemplary embodiments of the present invention.

FIG. 3 is an exploded perspective view exemplarily illustrating a main configuration of a dual-pass ejector 40 in the purge system in accordance with various exemplary embodiments of the present invention.

Figure 4:
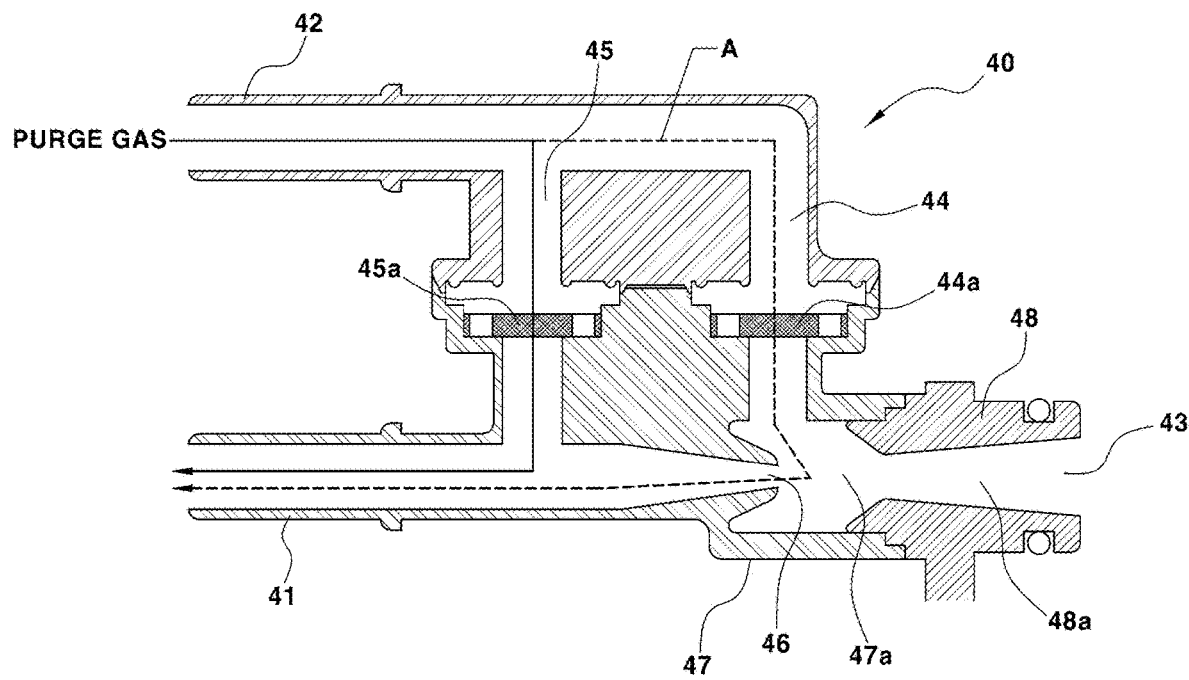
FIG. 4 and FIG. 5 are sectional views of the dual-pass ejector of the purge system in accordance with various exemplary embodiments of the present invention.
Figure 5:
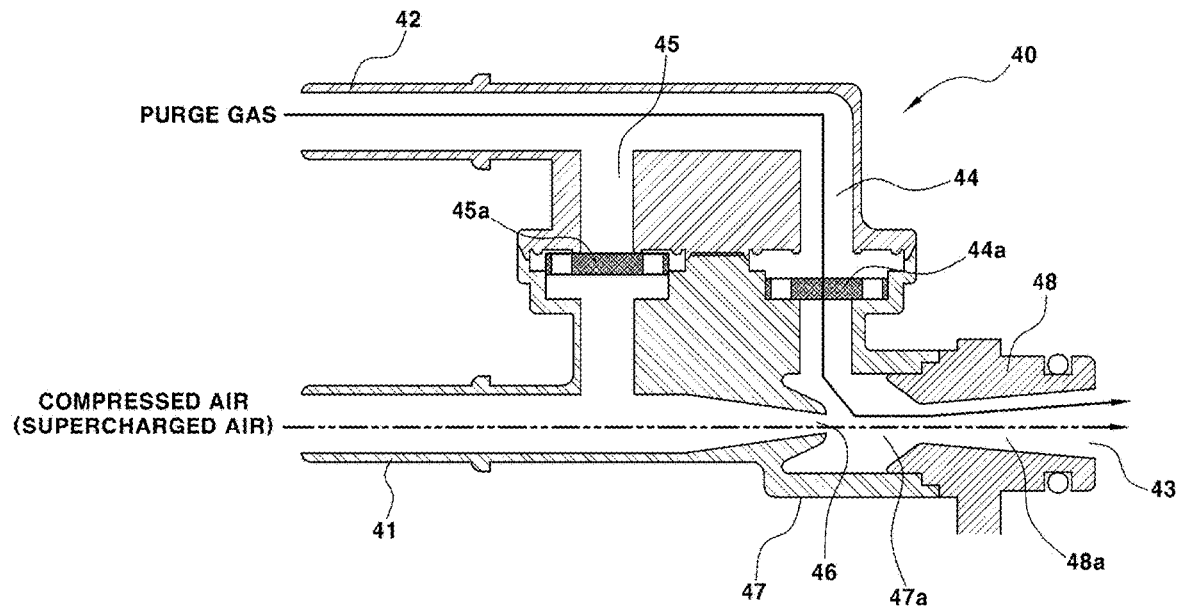

FIG. 4 and FIG. 5 are sectional views of the dual-pass ejector 40 of the purge system in accordance with various exemplary embodiments of the present invention. FIG. 4 illustrates an operating state of the purge system when an engine intake system is under negative pressure conditions, and FIG. 5 illustrates an operating state of the purge system when the engine intake system is under positive pressure conditions.

The negative pressure conditions of the engine intake system means a state in which when the engine 10 is operated (engine on), a negative pressure is applied to the engine intake system including an intake pipe 12, a surge tank 16, an intake manifold 17, etc. This state may be a state in which a negative pressure is generated in the engine 10 without an operation of the turbocharger.

The positive pressure conditions of the engine intake system means a state in which a positive pressure is applied to the engine intake system when the engine 10 is operated. This state may be a state in which the conventional single purge system cannot be operated, for example, may be a state in which the turbocharger is operated.

As illustrated in FIG. 2, a diffuser outlet 43 of the ejector 40 is directly coupled to the intake pipe 12 at the front end portion of the compressor 13 without a separate intermediate pipeline.

Furthermore, a purge line 31 extending from a canister 22 is coupled to a suction inlet 42 of the ejector 40. A recirculation fluid line 37 is coupled to a driving inlet 41 of the ejector 40.

The recirculation fluid line 37 is coupled from the engine intake system provided at the rear end portion of the compressor 13 to the driving inlet 41 of the ejector 40. For example, the recirculation fluid line 37 may be coupled from the intake pipe 12 provided at the rear end portion of the throttle valve 15, i.e., from the intake pipe 12 between the throttle valve 15 and the surge tank 16, to the driving inlet 41 of the ejector 40.

In the purge system in accordance with the exemplary embodiment of the present invention, the recirculation fluid line 37 is used not only as a gas path through which, when the turbocharger is in operation, compressed air which is compressed and transferred at high pressure by the compressor 13 and sequentially passes through the intercooler 14 and the throttle valve 15 is supplied to the driving inlet 41 of the ejector 40 as driving fluid, but also as a purge line through which, when the turbocharger is not operated, purge gas which is drawn from the canister 22 and passes through the ejector 40 is drawn into the engine intake system which is in a negative pressure state.

In other words, the recirculation fluid line 37 coupled to the driving inlet 41 of the ejector 40 functions not only as a driving fluid line through which, when the turbocharger is in operation, driving fluid (high-pressure compressed air) is supplied to the ejector 40, but also as a purge line through which, when the turbocharger is not operated, purge gas (a mixture gas of a fuel component and air) drawn from the canister 22 by the ejector 40 is supplied to the engine intake system.

Therefore, one end portion of the recirculation fluid line 37 is coupled to a portion of the engine intake system to which the negative pressure of the engine is applied so that purge gas may be drawn thereinto, and the other end portion of the recirculation fluid line 37 is coupled to the driving inlet 41 of the ejector 40.

Furthermore, in the purge system in accordance with the exemplary embodiment of the present invention, the driving inlet 41 of the ejector 40 functions not only as an inlet through which, when the turbocharger is in operation, compressed air which is driving fluid is supplied and drawn, but also as an outlet through which, when the turbocharger is not operated, purge gas drawn from the canister 22 through the suction inlet 42 is transferred to the engine intake system. In other words, the driving inlet 41 performs the role of the gas inlet when the turbocharger is in operation, and performs the role of the gas outlet when the turbocharger is not operated.

Consequently, as illustrated in FIG. 2, in the purge system in accordance with the exemplary embodiment of the present invention, there are only two gas lines for the purge operation, in other words, a gas line (i.e., the recirculation fluid line) between the ejector 40 and the engine intake system, and the gas line (i.e., the purge line) between the ejector 40 and the canister 22. Hence, simplification of the gas line, and reductions in the number of parts, the production cost, and the weight of the system are possible.

The ejector 40 of the purge system in accordance with various exemplary embodiments of the present invention will be descried with reference to FIG. 4 and FIG. 5. The fact that the ejector 40 receives high-pressure compressed air which is driving fluid and forcibly forms a negative pressure for purge operation is the same as that of the related art, but the internal configuration of the ejector 40 is improved compared to that of the conventional dual purge system.

There is no difference between the ejector 40 according to an exemplary embodiment of the present invention and the conventional ejector 40 in that they include a nozzle 46, a mixing portion 47, and a diffuser 48.

Furthermore, the fact that the ejector 40 according to an exemplary embodiment of the present invention may include an suction inlet 42 coupled to the mixing portion 47 through a suction passage 44, a driving inlet 41 coupled to the nozzle 46, and a diffuser outlet 43 configured as an outlet of the diffuser 48 is also the same as that of the conventional ejector 40.

However, in an exemplary embodiment of the present invention, a bypass passage 45 which directly couples between the suction inlet 42 and the driving inlet 41 is additionally formed in the ejector 40. Check valves 44a and 45a are respectively disposed on the suction passage 44 and the bypass passage 45.

Hereinafter, the check valve 44a which is disposed on the suction passage 44 will be referred to as 'first check valve', and the check valve 45a which is disposed on the bypass passage 45 will be referred to as 'second check valve'.

The first check valve 44a is configured to allow purge gas drawn from the suction passage 44 through the suction inlet 42 to flow only toward a mixing passage 47a in the mixing portion 47 of the ejector 40 but to prevent the purge gas from reversely flowing.

The second check valve 45a is configured to allow purge gas drawn from the bypass passage 45 through the suction inlet 42 to flow only toward the driving inlet 41 that functions not only as an inlet but also as an outlet, and to prevent the purge gas from reversely flowing.

Although FIG. 4 and FIG. 5 do not illustrate in detail the configuration of the check valve, a typical check valve which allows fluid to flow in a fluid passage only in a predetermined one direction but blocks reverse flow of the fluid may be applied to the ejector of the purge system in accordance with various exemplary embodiments of the present invention. The configuration of such a check valve is well known to those skilled in the present art; therefore, detailed description thereof will be omitted.

Under conditions in which the turbocharger is not in operation and thus a negative pressure by the engine 10 is generated in and applied to the engine intake system, in other words, in the case of the negative pressure conditions of the engine intake system, the negative pressure of the engine intake system is applied to the driving inlet 41 of the ejector 40 through the recirculation fluid line 37.

Consequently, as illustrated in FIG. 4, purge gas (mixture gas of air and a fuel component drawn from the canister) which is drawn from the canister 22 into the suction inlet 42 of the ejector 40 through the purge line 31 and the PCSV 34 flows to the driving inlet 41 via the bypass passage 45 of the ejector 40 and the second check valve 45a.

Here, the driving inlet 41 functions as a gas outlet. Purge gas which is drawn through the suction inlet 42 flows to the driving inlet 41 through the bypass passage 45 in the ejector 40, and is drawn into the engine intake system through the recirculation fluid line 37 and then drawn into the combustion chamber of the engine 10 via the surge tank 16 and combusted in the combustion chamber.

On the other hand, under conditions in which the turbocharger is operated and a positive pressure rather than a negative pressure is generated in the engine intake system, in other words, in the case of the positive pressure conditions of the engine intake system, compressed air (supercharged air) which is compressed by the compressor 13 and passes through the intercooler 14 and the throttle valve 15 is supplied to the driving inlet 41 of the ejector 40 through the recirculation fluid line 37 in the engine intake system.

High-pressure compressed air which is drawn into the driving inlet 41 of the ejector 40 generates a negative pressure while passing through the nozzle 46 in the ejector 40 and the mixing passage 47a in the mixing portion 47. The negative pressure generated in the mixing passage 47a is applied to the suction inlet 42 of the ejector 40 through the suction passage 44, whereby purge gas is drawn from the canister 22 into the suction inlet 42.

Consequently, purge gas which is drawn from the canister 22 into the suction inlet 42 through the purge line 31 and the PCSV 34 disposed on the purge line 31 is drawn into the mixing passage 47a in the mixing portion 47 through the suction passage 44 and the first check valve 44a. The drawn purge gas is mixed, in the mixing passage 47a, with compressed air supplied through the driving inlet 41.

Furthermore, the mixture gas passes through a diffusion passage 48a in the diffuser 48 of the ejector 40 and is discharged from the diffuser outlet 43 to the intake pipe 12. Thereafter, the mixture gas is drawn, along with fresh air drawn through an air cleaner (not shown in FIG. 2, and refer to reference numeral 11 of FIG. 11), into the combustion chamber of the engine 10 sequentially via the compressor 13, the intercooler 14, the intake pipe 12, the throttle valve 15, and the surge tank 16.

In the purge system according to an exemplary embodiment of the present invention, the bypass passage 45 of the ejector 40 is a passage which is additionally formed in the ejector 40 to secure an appropriate purge rate of fuel evaporation gas. The bypass passage 45 and the suction passage 44 in the ejector 40 are coupled in common to the suction inlet 42.

In the ejector 40, an internal passage of the suction inlet 42 is diverged into the suction passage 44 and the bypass passage 45. Each of the suction passage 44 and the bypass passage 45 is used as a purge path.

However, the suction passage 44 in the ejector 40 is a passage which is coupled to the mixing passage 47a in the mixing portion 47 disposed at a downstream side of the nozzle 46 based on a direction in which driving fluid flows from the suction inlet 42 in the ejector. On the other hand, the bypass passage 45 is a passage which is coupled to the driving inlet 41 disposed at an upstream side of the nozzle 46 based on the direction in which driving fluid flows from the suction inlet 42 in the ejector.

In the purge system according to an exemplary embodiment of the present invention, purge gas drawn through the suction inlet 42 passes through any one selected from between the suction passage 44 and the bypass passage 45 depending on whether the turbocharger is operated and whether the engine intake system is in a positive state or a negative state.

In FIG. 4, arrow 'A' indicates an imaginary path along which purge gas flows under negative pressure conditions of the engine intake system when the ejector 40 used in the conventional dual purge system, i.e., the ejector 40 that does not include the bypass passage 45 and the second check valve 45a of the configuration of FIG. 4, is intactly applied to the purge system shown in FIG. 2.

If the bypass passage 45 and the second check valve 45a that are illustrated in FIG. 4 are not provided in the ejector 40 used in the purge system of FIG. 2, purge gas drawn through the suction inlet 42 under the negative pressure conditions of the engine intake system, as illustrated in FIG. 4, may reversely pass through the nozzle 46, as indicated by arrow 'A', and then is drawn into the engine intake system through the driving inlet 41.

In the instant case, since the purge gas drawn into the suction inlet 42 that has passed through the suction passage 44 is required to pass through the nozzle 46 with a passage having a very small cross-sectional area from the right to the left based on the drawing, the flow rate of purge gas may be greatly reduced, whereby it is difficult to secure a sufficient purge rate of fuel evaporation gas.

Figure 6:
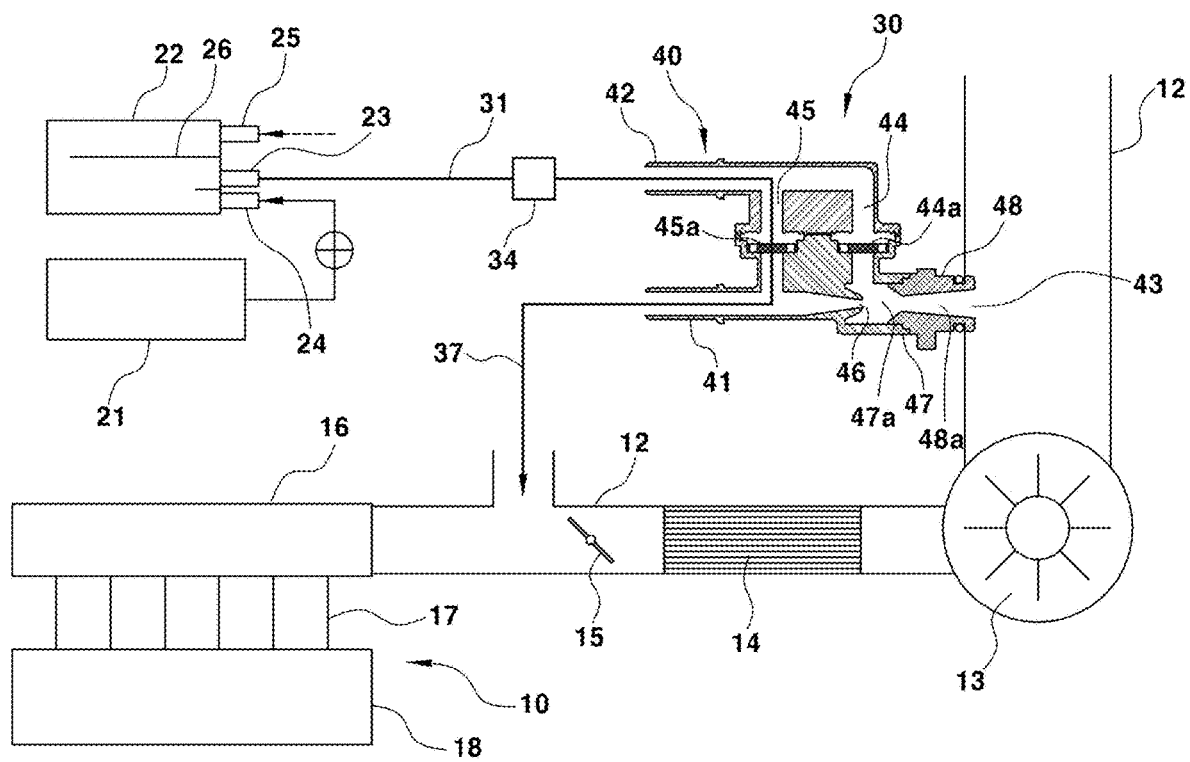
FIG. 6 and FIG. 7 are diagrams separately illustrating paths along which purge gas flows depending on a pressure state of an engine intake system and whether a turbocharger is operated, in accordance with various exemplary embodiments of the present invention.
Figure 7:
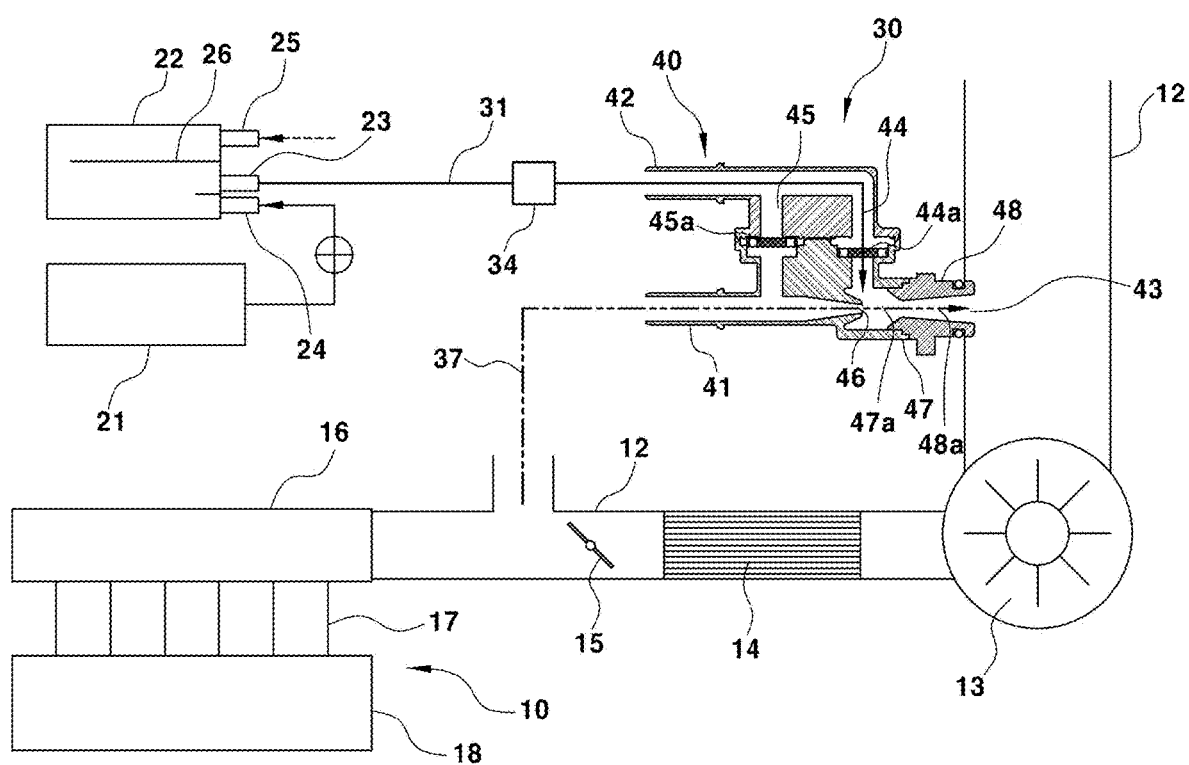

FIG. 6 and FIG. 7 are diagrams separately illustrating paths along which purge gas flows depending on whether the turbocharger is operated and the pressure state of the engine intake system.

FIG. 6 illustrates a path along which purge gas is drawn from the canister 22 into the engine intake system when the engine intake system is under negative pressure conditions, and there is illustrated an example where, due to a difference between the pressure (the atmospheric pressure) in the canister 22 and the pressure (the negative pressure) in the engine intake system, the purge gas is drawn from the canister 22 into the engine intake system after passing through the suction inlet 42 of the ejector 40, the bypass passage 45, and the driving inlet 41.

On the other hand, FIG. 7 illustrates a path along which purge gas is drawn from the canister 22 into the engine intake system when the engine intake system is under positive conditions, and there is illustrated an example where air compressed to a high pressure by the compressor 13 of the turbocharger is supplied from the engine intake system which is in the positive pressure state to the driving inlet 41 of the ejector 40 through the recirculation fluid line 37.

Here, while the high-pressure compressed air passes through the nozzle 46 in the ejector 40 and then passes through the mixing passage 47a of the mixing portion 47, a negative pressure is generated in the mixing passage 47a in the ejector 40.

Furthermore, due to the negative pressure of the mixing passage 47a in the ejector 40 and the pressure (the atmospheric pressure) in the canister 22, the purge gas is drawn from the canister 22 into the mixing passage 47a of the mixing portion 47 through the suction inlet 42 of the ejector 40 and the suction passage 44.

Consequently, in the mixing passage 47a of the mixing portion 47, a mixture of compressed air which is driving fluid and purge gas which is suction fluid passes through the diffusion passage 48a in the diffuser 48 and is discharged to the intake pipe 12 through the diffuser outlet 43. Subsequently, the discharged gas is supplied, along with fresh air (new air) drawn by the compressor 13, into the combustion chamber of the engine 10 via the compressor 13, the intercooler 14, and the throttle valve 15.

As described above, in a purge system of fuel evaporation gas of a vehicle in accordance with various aspects of the present invention, only two gas lines for a purge operation, in other words, a gas line (i.e., a recirculation fluid line) between an ejector and an engine intake system, and a gas line (i.e., a purge line) between the ejector and a canister, are required. Hence, simplification of the gas line, and reductions in the number of parts, the production cost, and the weight of the system are possible.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A purge system for fuel evaporation gas of a vehicle, the purge system comprising:

an ejector apparatus including:
  a nozzle configured to allow driving fluid to pass therethrough;
  a driving inlet fluidically-connected to the nozzle and through which the driving fluid is supplied into the nozzle of the ejector apparatus;
  a suction passage and a suction inlet fluidically-connected to the nozzle through the suction passage, wherein purge gas including a fuel component is drawn through the suction inlet as suction fluid from a canister into the ejector apparatus;
  a diffuser outlet fluidically-connected to the nozzle and through which a mixture of the driving fluid that has passed through the nozzle and the drawn purge gas is discharged out of the ejector apparatus; and
  a bypass passage fluidically-connecting unidirectionally from the suction inlet to the driving inlet, by bypassing the suction passage,
wherein the suction passage is formed to extend from the suction inlet toward a downstream side of the nozzle based on a flow direction of the driving fluid,
wherein a recirculation fluid line is coupled to the driving inlet of the ejector apparatus from an engine intake system at a rear end portion of a compressor of a turbocharger, and
wherein air compressed by the compressor of the turbocharger is supplied as the driving fluid from the engine intake system to the driving inlet of the ejector apparatus, or the purge gas, which is the suction fluid, is drawn from the driving inlet into the engine intake system.

2. The purge system of claim 1,
wherein the nozzle is positioned at a mixing portion where ends of the driving inlet, the suction passage and the diffuser outlet are joined.

3. The purge system of claim 1,
wherein a purge line is coupled to the suction inlet of the ejector apparatus so that the purge gas is drawn from the canister into the ejector apparatus, and
wherein the diffuser outlet of the ejector apparatus is coupled to an intake pipe at a front end portion of the compressor of the turbocharger.

4. The purge system of claim 1,
wherein the ejector apparatus further includes a first check valve disposed on the suction passage and configured to allow the suction fluid to flow from the suction inlet to the downstream side of the nozzle and block a reverse flow of the suction fluid.

5. The purge system of claim 1,
wherein the ejector apparatus further includes a second check valve mounted on the bypass passage and configured to allow the suction fluid to flow from the suction inlet to the driving inlet and block a reverse flow of the suction fluid.

6. The purge system of claim 1,
wherein the diffuser outlet of the ejector apparatus is directly coupled to an intake pipe at a front end portion of the compressor of the turbocharger.

7. The purge system of claim 1,
wherein the recirculation fluid line is coupled from an intake pipe at a rear end portion of a throttle valve to the driving inlet of the ejector apparatus.

8. An ejector comprising:
a nozzle configured to allow driving fluid supplied out of an engine to pass therethrough;
  a driving inlet fluidically-connected to the nozzle and through which the driving fluid is supplied into the nozzle of the ejector;
  a suction passage and a suction inlet fluidically-connected to the nozzle through the suction passage, wherein purge gas of a canister and including a fuel component is drawn through the suction inlet as suction fluid;
  a diffuser outlet fluidically-connected to the nozzle and through which a mixture of the driving fluid that has passed through the nozzle and the drawn purge gas is discharged out of the ejector; and
  a bypass passage fluidically-connecting unidirectionally from the suction inlet to the driving inlet, by bypassing the suction passage.

9. The ejector of claim 8,
wherein the nozzle is positioned at a mixing portion where ends of the driving inlet, the suction passage, and the diffuser outlet are joined.

10. The ejector of claim 8,
wherein the ejector further includes a first check valve disposed on the suction passage and configured to allow the suction fluid to flow from the suction inlet to a downstream side of the nozzle and block a reverse flow of the suction fluid.

11. The ejector of claim 8, further including a second check valve mounted on the bypass passage and configured to allow the suction fluid to flow from the suction inlet to the driving inlet and block a reverse flow of the suction fluid.

12. A purge system for fuel evaporation gas of a vehicle, the purge system comprising:
an ejector, a canister, a compressor of a turbocharger, an engine intake system, and a recirculation fluid line,
wherein the ejector is provided therein with:
  a nozzle configured to allow driving fluid to pass therethrough;
  a driving inlet fluidically-connected to the nozzle and through which the driving fluid is supplied into the nozzle of the ejector;
  a suction passage and a suction inlet fluidically-connected to the nozzle through the suction passage, wherein purge gas including a fuel component is drawn through the suction inlet as suction fluid from the canister into the ejector;
  a diffuser outlet fluidically-connected to the nozzle and through which a mixture of the driving fluid that has passed through the nozzle and the drawn purge gas is discharged out of the ejector; and
  a bypass passage fluidically-connecting unidirectionally from the suction inlet to the driving inlet, by bypassing the suction passage,
wherein the suction passage is formed to extend from the suction inlet toward a downstream side of the nozzle based on a flow direction of the driving fluid,
wherein the recirculation fluid line is coupled to the driving inlet of the ejector from an engine intake system at a rear end portion of a compressor of a turbocharger, and
wherein air compressed by the compressor of the turbocharger is supplied as the driving fluid from the engine intake system to the driving inlet of the ejector, or the purge gas, which is the suction fluid, is drawn from the driving inlet into the engine intake system.

13. The purge system of claim 8, wherein an internal passage of the suction inlet of the ejector is diverged into the suction passage and the bypass passage and each of the suction passage and the bypass passage is used as a purge path.

* * * * *